United States Patent
Ota

(10) Patent No.: US 9,736,622 B2
(45) Date of Patent: Aug. 15, 2017

(54) NEAR-FIELD WIRELESS COMMUNICATION SYSTEM, COMMUNICATION TERMINAL, AND COMMUNICATION METHOD

(71) Applicant: Icom Incorporated, Osaka-shi, Osaka (JP)

(72) Inventor: Futoshi Ota, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/643,163

(22) Filed: Mar. 10, 2015

(65) Prior Publication Data

US 2015/0264516 A1  Sep. 17, 2015

(30) Foreign Application Priority Data

Mar. 13, 2014  (JP) ................................ 2014-050061

(51) Int. Cl.
  H04B 7/00  (2006.01)
  H04W 4/00  (2009.01)
  H04W 76/02  (2009.01)

(52) U.S. Cl.
  CPC ......... *H04W 4/008* (2013.01); *H04W 76/023* (2013.01); *H04W 76/025* (2013.01)

(58) Field of Classification Search
  None
  See application file for complete search history.

(56) References Cited

U.S. PATENT DOCUMENTS

| | | | |
|---|---|---|---|
| 6,272,343 B1 * | 8/2001 | Pon ...................... | H04W 72/02 455/161.2 |
| 2004/0053606 A1 * | 3/2004 | Artamo ................. | H04W 16/14 455/422.1 |
| 2005/0143840 A1 * | 6/2005 | Matsukura ......... | G05B 19/0423 700/9 |
| 2005/0198378 A1 * | 9/2005 | Okada ................... | G06F 9/5072 709/238 |
| 2006/0135204 A1 * | 6/2006 | Angelhag ........... | H04M 1/6041 455/557 |
| 2008/0125042 A1 | 5/2008 | Kim | |

(Continued)

FOREIGN PATENT DOCUMENTS

JP    2008-141744    6/2008

*Primary Examiner* — Zhiyu Lu
(74) *Attorney, Agent, or Firm* — Norris McLaughlin & Marcus, P.A.

(57) ABSTRACT

The communication terminals each includes a communication controller for identifying the communication terminal to be reconnected as a communication destination after an inter-terminal connection is disrupted. The communication controller includes a first table and a second table. The first table is configured to, while placing a highest priority on the communication terminal most recently connected before the inter-terminal connection is disrupted, place a first connection priority on the other communication terminals according as a connection order in a direction of going back in time. The second table is configured to place a second connection priority on the other communication terminals by each device function thereof. The communication controller identifies, as the communication terminal to be reconnected as the communication destination, a communication terminal with the first connection priority ranked highest among the other communication terminals with the second connection priority ranked highest.

3 Claims, 4 Drawing Sheets

(56) References Cited

U.S. PATENT DOCUMENTS

| | | | |
|---|---|---|---|
| 2009/0298452 A1* | 12/2009 | Ota | H03J 1/0091 |
| | | | 455/161.1 |
| 2010/0014470 A1* | 1/2010 | Prytz | H04L 12/5692 |
| | | | 370/329 |
| 2010/0211573 A1* | 8/2010 | Sekiguchi | G06F 17/30336 |
| | | | 707/747 |
| 2010/0216400 A1* | 8/2010 | Ushijima | H04M 1/6091 |
| | | | 455/41.2 |
| 2013/0005263 A1* | 1/2013 | Sakata | H04W 76/027 |
| | | | 455/41.2 |
| 2014/0018000 A1* | 1/2014 | Seymour | H04W 48/16 |
| | | | 455/41.2 |
| 2015/0105018 A1* | 4/2015 | Elzein | H04W 4/008 |
| | | | 455/41.2 |

* cited by examiner

NEAR-FIELD WIRELESS COMMUNICATION SYSTEM, COMMUNICATION TERMINAL, AND COMMUNICATION METHOD

BACKGROUND OF THE INVENTION

Field of the Invention

The invention relates to near-field wireless communication systems including a plurality of communication terminals to be interconnected for mutual communications through near-field wireless communication, and communication terminals and communication methods for use with the systems.

Description of the Related Art

In some of the near-field wireless communication systems disclosed so far, plural communication terminals are interconnected through near-field wireless communication, such as Bluetooth (registered trademark) communication, to allow mutual communications therebetween. JP 2008-141744 A discloses an example of such systems.

In the case where the communication terminals are disconnected from each other, these near-field wireless communication systems are operable to interconnect them again. At the time of instantaneously interrupted interconnection, for example, one of interconnected communication terminals will soon be automatically connected again to the other communication terminal most recently connected thereto before the inter-terminal connection was disrupted.

For the sake of automatic reconnection between the disconnected communication terminals, the communication terminals contain connection-related data of their communication destinations. At the time of startup, for example, the communication terminal automatically recognizes the communication terminal most recently connected thereto before the inter-terminal connection is disrupted based on the data, and then reconnects to the recognized communication terminal.

This process of reconnection, though conveniently useful at the time of restarting the instantaneously disconnected communication terminal, may be disadvantageous in that the communication terminal to be reconnected is confined to the most recently connected communication terminal before the inter-terminal connection is disrupted.

However, it is not necessarily the most recently connected communication terminal that should be reconnected when the inter-terminal connection is lost. A choice to intentionally change the communication terminal to be reconnected entails such an additional burden as manual do-over after the inter-terminal connection is restored again.

The invention provides a near-field wireless communication system with an improved workability in reconnecting communication terminals, a communication terminal, and a communication method.

SUMMARY OF THE INVENTION

1) The invention provides a near-field wireless communication system operable to connect at least three communication terminals to one another to allow mutual communications through near-field wireless communication among the communication terminals, wherein the communication terminals each includes a communication controller for identifying a communication terminal to be reconnected as a communication destination after an inter-terminal connection is disrupted, the communication controller includes a first table and a second table, the first table is configured to, while placing a highest priority on a communication terminal most recently connected before the inter-terminal connection is disrupted, place a first connection priority on other communication terminals according as a connection order in a direction of going back in time, the second table is configured to place a second connection priority on the other communication terminals by each device function thereof, and the communication controller identifies, as a communication terminal to be reconnected as the communication destination, a communication terminal with the first connection priority ranked highest in the first table among the other communication terminals with the second connection priority ranked highest in the second table.

2) The invention further provides a communication terminal communicably connected to at least two other communication terminals through near-field wireless communication with the other communication terminals, wherein the communication terminal includes a communication controller for identifying a communication terminal to be reconnected as a communication destination after an inter-terminal connection is disrupted, the communication controller includes a first table and a second table, the first table is configured to, while placing a highest priority on a communication terminal most recently connected before the inter-terminal connection is disrupted, place a first connection priority on the other communication terminals according as a connection order in a direction of going back in time, the second table is configured to place a second connection priority on the other communication terminals by each device function thereof, and the communication controller identifies, as the communication terminal to be reconnected as the communication destination, a communication terminal with the first connection priority ranked highest in the first table among the other communication terminals with the second connection priority ranked highest in the second table.

The invention provides a communication method employed for a communication terminal to communicate with at least two other communication terminals through near-field wireless communication, the method including:

a first step of, while placing a highest priority on a communication terminal most recently connected before an inter-terminal connection is disrupted, placing a first connection priority on the other communication terminals according as a connection order in a direction of going back in time;

a second step of placing a second connection priority on the other communication terminals by each device function thereof, and a third step of identifying, as the communication terminal to be reconnected as a communication destination, a communication terminal with the first connection priority ranked highest in the first table among the other communication terminals with the second connection priority ranked highest in the second table.

Thus, the invention advantageously identifies a communication terminal with the first connection priority ranked highest in the first table, among the other communication terminals with the second connection priority ranked highest in the second table.

This technical advantage of the invention ensures that a communication terminal is connected to another communication terminal with desirable functional features that was most recently connected to the communication terminal but is currently disconnected therefrom.

In the case of failure to reconnect to any desirable communication terminal, the invention dispenses with such an additional burden as manual do-over, leading to an improved workability in reconnecting communication terminals.

BRIEF DESCRIPTION OF THE DRAWINGS

These and other objects as well as advantages of the invention will become clear by the following description of an embodiment and appended claims of the invention. A number of benefits undisclosed in this description will come to the attention of those skilled in the art when they actualize this invention.

DETAILED DESCRIPTION OF THE INVENTION

Figure 1:
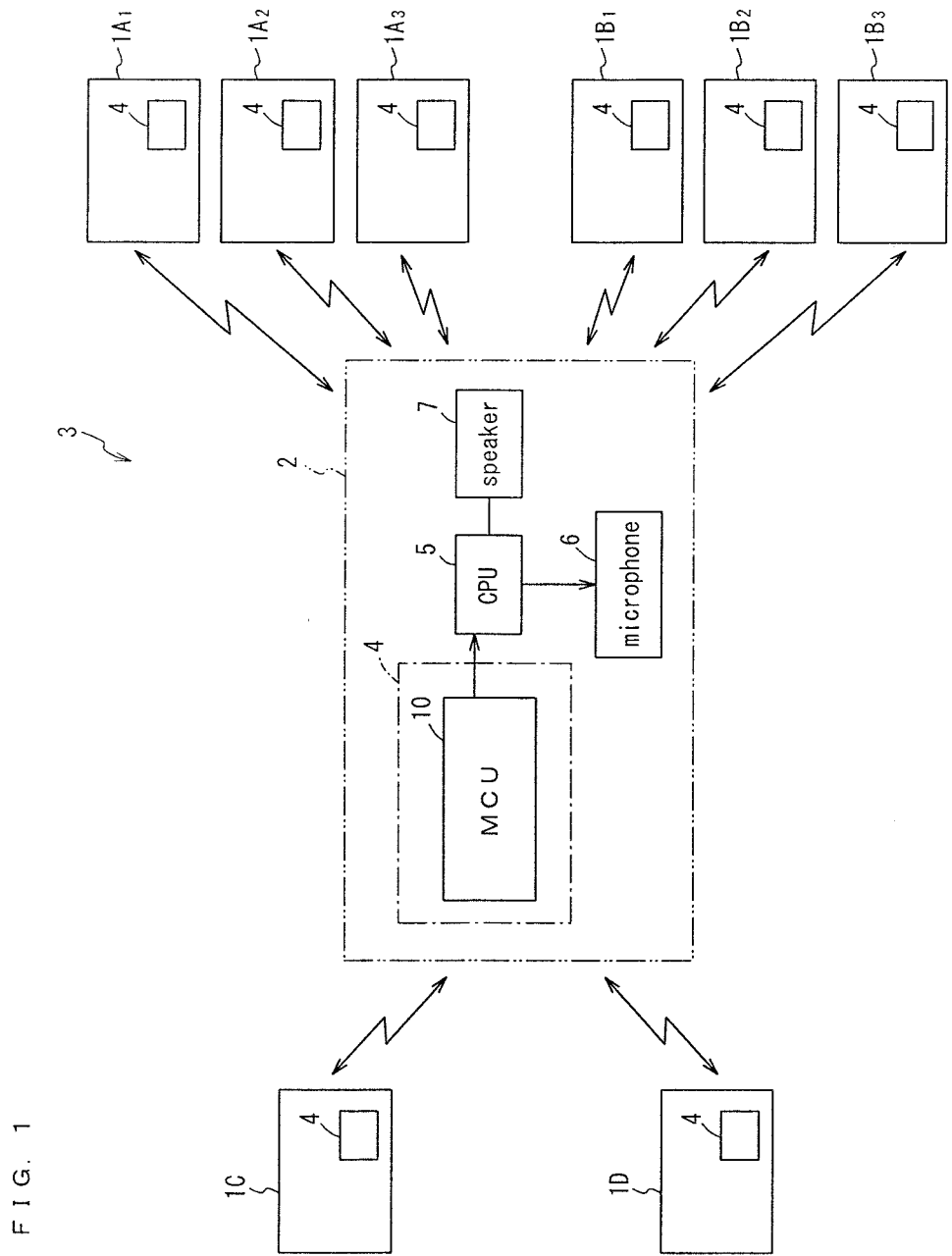
FIG. 1 is a block diagram of a communication system according to an embodiment of the invention.
Figure 2:
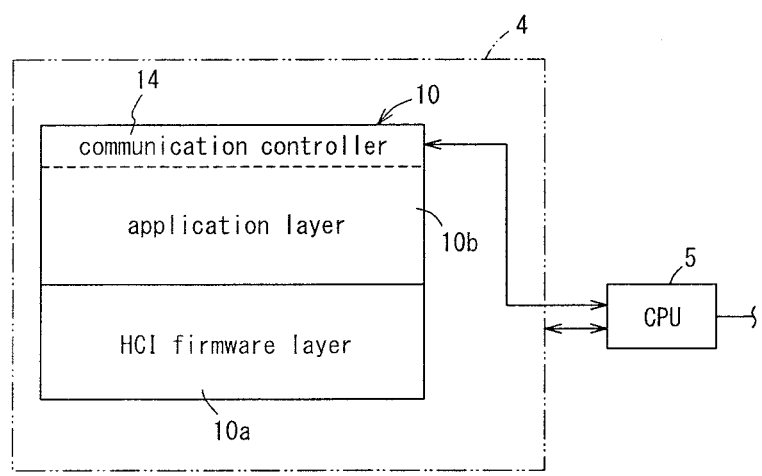
FIG. 2 is a block diagram of primary structural components of a communication terminal according to the embodiment.

A near-field wireless communication system according to an embodiment of the invention is hereinafter described in detail. Referring to FIGS. 1 and 2, a near-field wireless communication system 3 has wireless devices 1A1 to 1A3, multi-functional mobile telephones (hereinafter, smart phones) 1B1 to 1B3, a personal computer 1C, a game player 1D, and a wireless headset 2.

The wireless devices 1A1 to 1A3, smart phones 1B1 to 1B3, personal computer (PC) 1C, game player 1D, and wireless headset 2 are respectively examples of communication terminals connected through near-field wireless communication for mutual communications. Each of these communication terminals has a near-field wireless communication module 4 to perform near-field wireless communication. The devices of the system 3 are not exactly the communication terminals 1A1 to 1A3, 1B1 to 1B3, 1C, 1D and 2. The system 3 may optionally have more or less devices.

The wireless devices 1A1 to 1A3 each has, as well as a function to perform the near-field wireless communication by using the near-field wireless communication module 4, a function to wirelessly communicate with other wireless devices not illustrated in the drawing through universal wireless communication that differs from the near-field wireless communication.

The smart phones 1B1 to 1B3 each has a function to perform near-field wireless communication by using the near-field wireless communication module 4 and a function to perform audio and data communications with other smart phones and mobile phones not illustrated in the drawing through universal wireless mobile communication that differs from the near-field wireless communication.

The personal computer 1C has a function to perform data communicate with other communication terminals by using the near-field wireless communication module 4.

The game player 1D has a function to run multiplayer games with other game players by using the near-field wireless communication module 4.

The wireless headset 2 is worn on an operator's head to transmit and receive audio data to and from the wireless devices 1A1 to 1A3, smart phones 1B1 to 1B3, and personal computer 1C through the near-field wireless communication. The wireless headset 2 has a CPU 5, a microphone 6, and a speaker 7. The CPU 5 controls the whole wireless headset 2 including its near-field wireless communication module 4.

An MCU (microcontroller unit) 10 is provided in each of the near-field wireless communication modules 4 of the communication terminals 1A1 to 1A3, 1B1 to 1B3, 1C, 1D and 2. A protocol stack embedded in the MCU 10 has an HCI firmware layer 10a and an application layer 10b. In the application layer 10b are installed pieces of software which are run under the control of a virtual machine (hereinafter, VM).

The VM is a framework or software that emulates the operations of the HCI firmware layer 10a and the application layer 10b on the MCU 10.

In the HCI firmware layer 10a is implemented an HCI firmware which is run based on the protocol of HCI (host controller interface). The HCI firmware includes a communication control software program for control of the near-field wireless communication.

In the application layer 10b are implemented host software and applications which are run on the host. The applications implemented in the application layer 10b include a communication controller 14.

The communication controller 14 is an application to control the near-field wireless communication. The communication controller 14 includes a first table 14A and a second table 14B.

Figure 3:
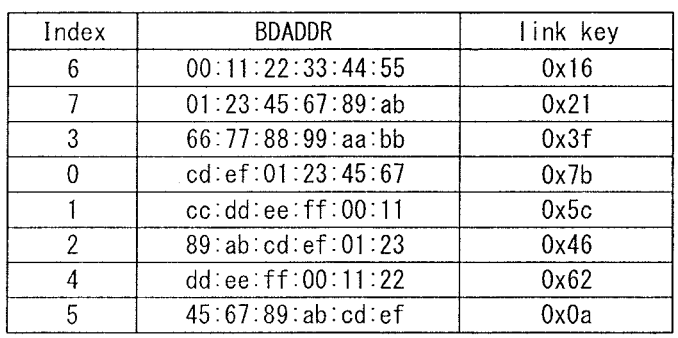
FIG. 3 is a drawing of a first table.
Figure 4:
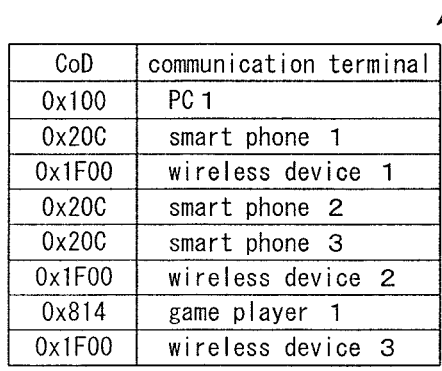
FIG. 4 is a drawing of a second table.

FIGS. 3 and 4 illustrate the first table 14A and the second table 14B. The first table 14A and the second table 14B contain pieces of data related to communications with other communication terminals to communicate with. The data are stored in these tables in order of registration. In these tables 14A and 14B, the data in upper rows have older registration dates and times.

In the first table 14A of FIG. 3, pieces of address information (hereinafter, BDADDR) for identifying the communication terminal of the communication destination to communicate with through the near-field wireless communication and link keys are associated with each other and stored in order of registration. The link key refers to connection-identifying data generated every time it succeeds to establish connection (pairing) between the communication terminals of the communication destination in order to identify each connection. The connection-identifying data serve as a generally called password.

In the first table 14A are listed degrees of priority for reconnecting the communication terminals of the communication destination according as a connection order in a direction of going back in time, as a communication terminal of the communication destination, which is most recently connected before the inter-terminal connection is disrupted, is a communication terminal to be reconnected with the highest priority. This refers to a first connection priority according to the invention. The first connection priority is registered in the first table 14A as index data. In the index data, "0" indicates the highest priority rank, and the priority rank is lower with "1", "2", "3", . . . .

In the second table 14B of FIG. 4 are listed class-of-device data (hereinafter, Cod) identifying device function of the communication terminals and data indicating the names of the device function of the communication terminals. These data are associated with each other and stored in order of registration.

The communication terminals are classified based on their device functions into, for example, "wireless device", "smart phone", "personal computer", "game player", and "wireless headset".

Referring to FIG. 4, "0x100" is Cod (abbreviation for class of device) identifying "personal computer" (PC), "0x20C" is Cod identifying "smart phone", "0x1F00" is Cod identifying "wireless device", and "0x814" is Cod identifying "game player".

Though not illustrated in the drawings, the device functions of the communication terminals to be reconnected as a communication destination are numbered in priority order. This is a second connection priority according to the invention.

Describing the second connection priority, for example, the "wireless device" is defined as the device function of the first priority rank (highest priority), while the other device functions are defined as the device function of the lower priority ranks than the first priority rank. The second table 14B reads and uses the priority numbers stored in the communication controller 14.

The priority numbers may be registered in the second table 14B instead of the communication controller 14. These priority numbers may be recorded as fixed data in the communication controller 14 or the second table 14B, or may be optional data to be decided by a user.

The data of priority numbers are updated in the first table 14A and the second table 14B for any change in the near-field wireless communication between the communication terminals communicating with each other.

Two examples of the data update are described below.
  to succeed in registering new data (paring) as to the communication terminal chosen as a new communication destination
  to reconnect the communication terminal of the communication destination already connected once and then disconnected whose connection-related data is already registered In the former example, the data of the first table 14A and the second table 14B are both updated (new data is added). In the latter example, the index data of the first table 14A alone is updated.

In a one-to-one relationship between the first table 14A and the second table 14B, the data of the communication terminals stored in these tables are linked to each other.

More specifically, there is one-on-one linkage between the communication terminal of the communication destination whose information is registered in an uppermost data region of the first table 14A and the communication terminal of the communication destination whose information is registered in an uppermost data region of the second table 14B. The one-on-one communication terminals of these tables refer to the communication destination.

Similarly, there is one-on-one linkage between the communication terminals of the communication destination having their pieces of information registered in respective rows of the first table 14A and the second table 14B.

For reconnection between the communication terminals, the communication controller 14 identifies, by consulting the first table 14A and the second table 14B, one communication terminal further with the first connection priority ranked highest in the first table 14A, of the other communication terminals with the second connection priority ranked highest in the second table 14B as the communication terminal to be reconnected as a communication destination.

Figure 5:
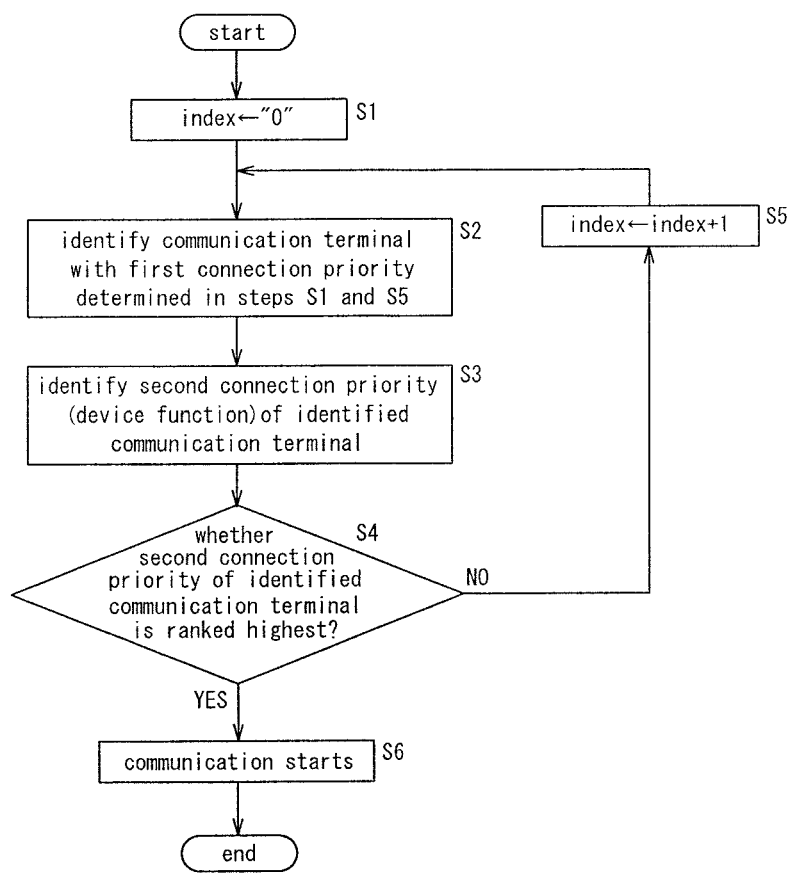
FIG. 5 is a reconnection control flow chart performed by the communication terminal according to the embodiment.

Referring to the flow chart of FIG. 5, processing steps of the near-field wireless communication are hereinafter described, wherein the wireless headset 2 is a master terminal, and the other communication terminals are slave terminals. The communication controllers 14 in all of the communication terminals including the wireless headset 2, every time when starting to communicating with (succeeding in pairing with) the other communication terminals of the communication destination for the first time, obtain connection-related information of the relevant communication terminals of the communication destination from the first communication performed therebetween and store the obtained information in the first table 14A and the second table 14B. According to the near-field wireless communication protocol, connection-related information of at most eight communication terminals can normally be stored in the first table 14A and the second table 14B.

In the example shown in FIGS. 3 and 4, connection-related data of the following devices are registered in the first table 14A and the second table 14B in the mentioned order; "personal computer (PC) 1", "smart phone 1", "wireless device 1", "smart phone 2", "smart phone 3", "wireless device 2", "game player 1", and "wireless device 3".

In the described example hypothetically defining the wireless headset 2 as a master terminal, no connection-related data of the "wireless headset" is registered in the first table 14A and the second table 14B. In the example is further hypothetically defined that the master terminal, wireless headset 2, is most recently connected to one of the slave terminals, smart phone 2, as shown in the first table 14A and the second table 14B.

Then, the wireless headset 2 most recently connected to the smart phone 2 is disconnected therefrom. When the wireless headset 2 and the smart phone 2 are then interconnected again, the communication controller 14 of the wireless headset 2 consults the index data of its own first table 14A. Then, the communication terminal with "0" appended thereto is identified as the communication terminal of the communication destination with the first connection priority ranked highest, in other words, the communication terminal of the communication destination most recently connected to the wireless headset 2. In the given example, the communication terminal whose connection-related information is registered in the fourth row from the top in the drawing is identified as the communication terminal of the communication destination with the first connection priority ranked highest (step S1, step S2).

After the communication terminal of the communication destination with the first connection priority ranked highest is identified in steps S1 and S2, the communication controller 14 of the wireless headset 2 consults its own second table 14B.

The communication controller 14 of the wireless headset 2 that consulted this table then identifies the device function of the communication terminal of the communication destination identified in step S2 (step S3). The given example identifies the device function of the communication terminal registered in the fourth row from the top of the second table 14B in the drawing. More specifically, the "smart phone 2" is identified as the slave terminal to communicate with, and its device function is "smart phone".

The communication controller 14 of the wireless headset 2, by consulting the second table 14B, determines the second connection priority imparted to the device function, "smart phone", identified in step S3 (step S4).

According to the second table 14B, the device function with the second connection priority ranked highest is, as described earlier, "wireless device". The communication controller 14 of the wireless headset 2 accordingly determines that the second connection priority of the device function, "smart phone", identified in step S3 is not ranked highest.

The communication controller 14 of the wireless headset 2 that determined so proceeds to step S5. In steps S5, the communication controller 14 of the wireless headset 2 increments by 1 the index data of the first table 14A, specifically, increments the index data to be consulted, which is currently index "0", to index "1".

The communication controller 14 of the wireless headset 2, after the process of step S5 (incrementing index data) is over, returns to step S2. In step S2, the communication controller 14 of the wireless headset 2, by consulting again the first table 14A, identifies the communication terminal of the communication destination with the first connection priority ranked next to the communication terminal identified previously in step S2 as the communication terminal to communicate with. Putting it differently, the communication terminal connected temporally right before the most recently connected communication terminal is identified as the communication terminal to communicate with. This is the communication terminal with index "1" whose connection-related information is registered in the fifth row from the top in the drawing. In step S2, the communication controller 14 of the wireless headset 2, by consulting the second table 14B, identifies the device function of the communication terminal identified again in step S2 (step S3). This is the device function of the communication terminal registered in the fifth row from the top of the second table 14B in the drawing. Specifically, the "smart phone 3" is identified as the communication terminal to communicate with, and its device function is "smart phone".

The communication controller 14 of the wireless headset determines again the second connection priority imparted to the device function, "smart phone", identified in step S3 (step S4). Referring to the second table 14B, the device function with the second connection priority ranked highest is "wireless device". The communication controller 14 of the wireless headset 2 accordingly determines that the second connection priority of the device function, "smart phone", identified in step S3 is not ranked highest.

The communication controller 14 of the wireless headset 2 that determined so proceeds to step S5. In step S5, the communication controller 14 of the wireless headset 2 increments by 1 the index data of the first table 14A, specifically, increments the index data to be consulted, which is currently index "1", to index "2". After the process of step S5 (incrementing index data) is over, the communication controller 14 of the wireless headset 2 returns to step S2.

In step S2, the communication controller 14 of the wireless headset 2, by consulting again the first table 14A, identifies the communication terminal with the first connection priority ranked next to the communication terminal identified previously in step S2 as the communication terminal to communicate with. Putting it differently the communication terminal connected temporally right before the two communication terminals, one of which is the most recently connected communication terminal, is identified as the communication terminal to communicate with. This is the communication terminal with index "2" whose connection-related information is registered in the sixth row from the top in the drawing.

Further, the communication controller 14 of the wireless headset 2, by consulting again the second table 14B, identifies the device function of the communication terminal of the communication destination identified in step S2 (step S3). This is the device function of the communication terminal registered in the sixth row from the top of the second table 14B in the drawing. Specifically, the "wireless device 2" is identified as the communication terminal to communicate with, and its device function is "wireless device".

In step S3, the communication controller 14 of the wireless headset 2 determines the second connection priority imparted to the device function. "wireless device", identified in step S3 (step S4). According to the second table 14B, the device function with the second connection priority ranked highest is "wireless device". The communication controller 14 of the wireless headset 2 accordingly determines that the second connection priority of the device function, "wireless device", identified in step S3 is ranked highest. The communication controller 14 of the wireless headset 2 that determined so starts to connect (through the near-field wireless communication) to the wireless device 2 thus identified (step S6).

As a result of these processes, the communication controller 14 of the wireless headset 2 identifies, as the communication terminal to communicate with, one of the other communication terminals (a group of communication terminals as communicating parties) with the second connection priority ranked highest in the second table 14B and further with the first connection priority ranked highest in the first table 14A.

When a user wants the communication terminals to be reconnected, the reconnection processes described thus far enable automatic reconnection to any desirable one of the communication terminals by consulting the first table 14A listing degrees of the first connection priority of the communication terminals according as a connection order in a direction of going back in time, and the second table 14B listing degrees of the second connection priority based on the device functions. This dispenses with an additional manual labor to reconnect the communication terminals, leading to a better workability.

In the embodiment described thus far, the master terminal is only allowed to connect to one slave terminal at a time. The invention including this aspect but not necessarily limited thereto may offer another aspect wherein the master terminal is connected to plural slave terminals at a time. According to this aspect, the communication terminals may be reconnected as conventionally done by consulting the first table 14A alone, or may be reconnected as described herein by consulting the first table 14A and the second table 14B both.

According to the embodiment, the communication terminals with the first connection priority ranked higher in the first table 14A are determined whether the device functions of these communication terminals are ranked highest in the second table 14B to identify the communication terminal to communicate with. Instead, the communication terminal identified as a communication destination may be one of the communication terminals having the highest first connection priority referring to the second table 14B and chronologically most recently connected referring to the first table 14A.

The embodiment described thus far provides two tables; first table 14A and second table 14B. The invention, however, may provide jut one table, in which all of data, such as connection order, BDADDR, link keys, CoD, and device names, are registered. Using one table, the second connection priority may be determined according to higher degrees of the first connection priority based on the chronological order of connection, or one of the communication terminals with the second connection priority and the first connection priority both ranked highest may be identified as the communication terminal to communicate with. Optionally, a user may be given a choice to use the second connection priority in order to identify the communication terminal to be reconnected as a communication destination.

The most preferred embodiment of the invention was thus far described in detail. This embodiment, however, may be variously modified without departing from the spirit and the scope of the invention defined in the appended claims.

What is claimed is:

1. A near-field wireless communication system operable to connect a master terminal to each of at least two slave terminals to allow mutual communications through near-field wireless communication,
   wherein the master terminal comprises a communication controller for identifying a slave terminal from among the at least two slave terminals to reconnect with after an inter-terminal connection is disrupted;
   wherein the communication controller comprises a first table and a second table;
   wherein the first table is configured to place a first connection priority on each of the at least two slave terminals according to a connection order in a direction backward in time, while placing a highest first connection priority on a most recently connected slave terminal, among said at least two slave terminals, that was connected to said master terminal most recently before the inter-terminal connection was disrupted;
   wherein the second table is configured to place a second connection priority of a first priority rank on a device function to be reconnected with the highest priority, among device functions of the at least two slave terminals, and to place a second connection priority being of a lower priority rank than the first priority rank and being numbered in priority order on each of the other device functions; and
   wherein the communication controller is configured to perform steps (i)-(viii) to select a communication destination, after the inter-terminal connection was disrupted:
   (i) a first step of identifying one slave terminal with the first connection priority ranked highest, among the at least two slave terminals, by referring to the first table;
   (ii) a second step of identifying the device function of the identified one slave terminal in the first step by referring to the second table after the first step;
   (iii) a third step of automatically reconnecting to the identified one slave terminal as the communication destination when the second connection priority of the first priority rank is placed on the identified device function in the second step by referring to the second table;
   (iv) a fourth step of forwarding the connection order when the second connection priority of the first priority rank is not placed on the identified device function in the second step by referring to the second table;
   (v) a fifth step of identifying another slave terminal, among the at least two slave terminals, corresponding to the forwarded connection order by referring to the first table after the fourth step;
   (vi) a sixth step of identifying the device function of the identified another slave terminal in the fifth step by referring to the second table after the fifth step;
   (vii) a seventh step of automatically reconnecting to the another slave terminal as the communication destination when the device function of the identified another slave terminal in the sixth step is the second connection priority of the first priority rank in the second table by referring to the second table; and
   (viii) an eighth step of repeatedly performing the fourth through seventh steps while forwarding the connection order until a slave terminal to be reconnected is identified when the device function of the identified another slave terminal in the sixth step is not the second connection priority of the first priority rank in the second table by referring to the second table.

2. A communication terminal, which is a master terminal, communicably connected to at least two slave terminals through near-field wireless communication with the at least two slave terminals,
   wherein the master terminal comprises a communication controller for identifying a slave terminal from among the at least two slave terminals to reconnect with after an inter-terminal connection is disrupted;
   wherein the controller comprises a first table and a second table;
   wherein the first table has a first-table entry for each one of the at least two slave terminals, each first-table entry having a first connection priority according to a connection order of each slave terminal prioritized based on time in a direction backward in time so that a highest first connection priority corresponds to one of the at least two slave terminals most recently connected to the master terminal before the inter-terminal connection is disrupted;
   wherein the second table has a second-table entry for each one of the at least two slave terminals, each second-table entry configured to place a second connection priority of a first priority rank on a device function to be reconnected with the highest priority among device functions of the at least two slave terminals, and to place a second connection priority being of a lower priority rank than the first priority rank and being numbered in priority order on each of the other device functions; and
   wherein the communication controller identifies a slave terminal from among the at least two slave terminals to be reconnected as a communication destination wherein the communication controller is configured to perform steps (i)-(viii) to select the communication destination, after the inter-terminal connection was disrupted:
   (i) a first step of identifying one slave terminal with the first connection priority ranked highest, among the at least two slave terminals, by referring to the first table;
   (ii) a second step of identifying the device function of the identified one slave terminal in the first step by referring to the second table after the first step;
   (iii) a third step of automatically reconnecting to the identified one slave terminal as the communication destination when the second connection priority of the first priority rank is placed on the identified device function in the second step by referring to the second table;
   (iv) a fourth step of forwarding the connection order when the second connection priority of the first priority rank is not placed on the identified device function in the second step by referring to the second table;

(v) a fifth step of identifying another slave terminal, among the at least two slave terminals, corresponding to the forwarded connection order by referring to the first table after the fourth step;

(vi) a sixth step of identifying the device function of the identified another slave terminal in the fifth step by referring to the second table after the fifth step;

(vii) a seventh step of automatically reconnecting to the another slave terminal as the communication destination when the device function of the identified another slave terminal in the sixth step is the second connection priority of the first priority rank in the second table by referring to the second table; and (viii) an eighth step of repeatedly performing the fourth through seventh steps while forwarding the connection order until a slave terminal to be reconnected is identified when the device function of the identified another slave terminal in the sixth step is not the second connection priority of the first priority rank in the second table by referring to the second table.

3. A communication method employed for a communication terminal which is a master terminal to communicate with at least two slave terminals through near-field wireless communication, the method comprising steps (1)-(3):

(1) placing a first connection priority on each one of the at least two slave terminals according as a connection order in a direction of going back in time, so that a highest first connection priority is placed on a slave terminal from among the at least two slave terminals, that was most recently connected to the master terminal before an inter-terminal connection was disrupted;

(2) placing a second connection priority of a first priority rank on a device function to be reconnected with the highest priority, among device functions of the at least two slave terminals, and placing a second connection priority being of a lower priority rank than the first priority rank and being numbered in priority order on each of other device functions; and (3) selecting a communication destination from among the at least two slave terminals, wherein the communication controller performs steps (i)-(viii) to select the communication destination, after the inter-terminal connection was disrupted, (i) a first step of identifying one slave terminal with the first connection priority ranked highest, among the at least two slave terminals, by referring to the first table;

(ii) a second step of identifying the device function of the identified one slave terminal in the first step by referring to the second table after the first step;

(iii) a third step of automatically reconnecting to the identified one slave terminal as the communication destination when the second connection priority of the first priority rank is placed on the identified device function in the second step by referring to the second table;

(iv) a fourth step of forwarding the connection order when the second connection priority of the first priority rank is not placed on the identified device function in the second step by referring to the second table;

(v) a fifth step of identifying another slave terminal, among the at least two slave terminals, corresponding to the forwarded connection order by referring to the first table after the fourth step;

(vi) a sixth step of identifying the device function of the identified another slave terminal in the fifth step by referring to the second table after the fifth step;

(vii) a seventh step of automatically reconnecting to the another slave terminal as the communication destination when the device function of the identified another slave terminal in the sixth step is the second connection priority of the first priority in the second table by referring to the second table; and (viii) an eighth step of repeatedly performing the fourth through seventh steps while forwarding the connection order until a slave terminal to be reconnected is identified when the device function of the identified another slave terminal in the sixth step is not the second connection priority of the first priority rank in the second table by referring to the second table.

* * * * *